(12) United States Patent
Tremblay

(10) Patent No.: US 6,212,604 B1
(45) Date of Patent: Apr. 3, 2001

(54) SHARED INSTRUCTION CACHE FOR MULTIPLE PROCESSORS

(75) Inventor: Marc Tremblay, Menlo Park, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/204,793

(22) Filed: Dec. 3, 1998

(51) Int. Cl.[7] ..................................................... G06F 13/00
(52) U.S. Cl. ............................ 711/125; 711/3; 711/123; 711/120
(58) Field of Search ................................... 711/119, 120, 711/123, 125, 3

(56) References Cited

U.S. PATENT DOCUMENTS

| | | | |
|---|---|---|---|
| 5,692,207 | 11/1997 | Ho-Lung et al. | 712/36 |
| 5,784,630 | * 7/1998 | Saito et al. | 712/30 |
| 5,958,038 | 9/1999 | Agrawal et al. | 712/36 |

FOREIGN PATENT DOCUMENTS

| | | |
|---|---|---|
| 0 588 341 A2 | 3/1994 | (EP) . |
| 0 911 725 AR | 4/1999 | (EP) . |

OTHER PUBLICATIONS

IBM Technical Disclosure Bulletin, Shared Instruction and/or Data Caches in a Multiprocessing System, vol. 27, No. 12, May 1985, pp. 6845–6846.*

* cited by examiner

*Primary Examiner*—David L. Robertson
(74) *Attorney, Agent, or Firm*—Skjerven Morrill Macpherson, LLP; Stephen A. Terrile

(57) ABSTRACT

The present invention provides a shared instruction cache for multiple processors. In one embodiment, an apparatus for a microprocessor includes a shared instruction cache for a first processor and a second processor, and a first register index base for the first processor and a second register index base for the second processor. The apparatus also includes a first memory address base for the first processor and a second memory address base for the second processor. This embodiment allows for segmentation of register files and main memory based on which processor is executing a particular instruction (e.g., an instruction that involves a register access and a memory access).

22 Claims, 5 Drawing Sheets

SHARED INSTRUCTION CACHE FOR MULTIPLE PROCESSORS

CROSS-REFERENCE TO RELATED APPLICATIONS

This application relates to application Ser. No. 09/204, 480, filed on even date herewith, entitled "A Multiple-Thread Processor For Threaded Software Applications" and naming Marc Tremblay and William Joy as inventors, the application being incorporated herein by reference in its entirety.

This application relates to application Ser. No. 09/205, 121, filed on even date herewith, entitled, "Dual In-line Buffers for an Instruction Fetch Unit", and naming Marc Tremblay and Graham R. Murphy as inventors, the application being incorporated herein by reference in its entirety.

This application relates to application Ser. No. 09/204, 781, filed on even date herewith, entitled, "An Instruction Fetch Unit Aligner", and naming Marc Tremblay and Graham R. Murphy as inventors, the application being incorporated herein by reference in its entirety.

This application relates to application Ser. No. 09/205, 120, filed on even date herewith, entitled, An Efficient Method For Fetching Instructions Having A Non-Power Of Two Size", and naming Marc Tremblay and Graham R. Murphy as inventors, the application being incorporated herein by reference in its entirety.

FIELD OF THE INVENTION

The present invention relates generally to microprocessors and, more particularly, to a shared instruction cache for multiple processors.

BACKGROUND OF THE INVENTION

A microprocessor typically includes a cache memory for storing copies of recently accessed information. The cache memory is generally smaller but faster than main memory (e.g., disk). In particular, a microprocessor typically includes an instruction cache for storing recently accessed (i.e., recently used) instructions. The instruction cache is generally located on the same integrated circuit chip (or die) as the core logic of the microprocessor.

FIG. 1 is a block diagram of a prior art instruction cache subsystem of a multi-processor system 100. In particular, multi-processor system 100 includes two processors, a P1 processor 102 and a P2 processor 104. P1 processor 102 and P2 processor 104 each access a main memory 106 via a bus 108. P1 processor 102 caches recently used instructions in an instruction cache 110. P2 processor 104 caches recently used instructions in an instruction cache 112. P1 processor 102 and instruction cache 110 reside on die (chip) 114. P2 processor 104 and instruction cache 112 reside on die 116. Accordingly, prior art system 100 represents an SMP (Symmetric Multi-Processing) system that shares memory, main memory 106. Further, instruction cache 110 and instruction cache 112 typically each include two ports, a port for connecting to P1 processor 102 and P2 processor 104, respectively, and a port for connecting to main memory 106. The ports can be physical ports or logical ports.

SUMMARY OF THE INVENTION

The present invention provides a shared instruction cache for multiple processors. For example, the present invention provides a cost-effective and high performance instruction cache subsystem in a microprocessor that includes multiple processors (i.e., CPUs (Central Processing Units)).

In one embodiment, an apparatus for a microprocessor includes an instruction cache that is shared by a first processor and a second processor, a first register index base for the first processor, and a first memory address base for the first processor. The apparatus also includes a second register index base for the second processor, and a second memory address base for the second processor. On each processor, a register access is offset using the register index base (e.g., a register address specifier is concatenated with the register index base). Similarly, on each processor, a memory access is offset using the memory address base (e.g., a memory address specifier is concatenated with the memory address base). This embodiment provides a shared instruction cache for multiple processors that provides a hardware implemented segmentation of register files and main memory based on which processor is executing a particular instruction (e.g., an instruction that involves a register access or a memory access). For example, this embodiment allows a thread of a multi-threaded computer program that is executed by the first processor and the same thread that is executed by the second processor to generate register files that can later be combined, because the register index base can be set such that the execution of the same thread on the first processor and the second processor do not overlap in their register address specifiers' usage of registers. Similarly, the same thread can be executed on the first processor and on the second processor and by setting different values in the memory address base, the data written into the main memory can be insured to not overlap such that the results of the execution of the same thread on the first processor and the second processor can subsequently be compared or combined.

Other aspects and advantages of the present invention will become apparent from the following detailed description and accompanying drawings.

DETAILED DESCRIPTION OF THE INVENTION

The present invention provides a shared instruction cache for multiple processors (i.e., CPUs (Central Processing Units)) (e.g., two CPUs or four CPUs). For example, a multi-processor microprocessor that desires a cost-effective and efficient implementation of an instruction cache subsystem would significantly benefit from the present invention.

Figure 1:
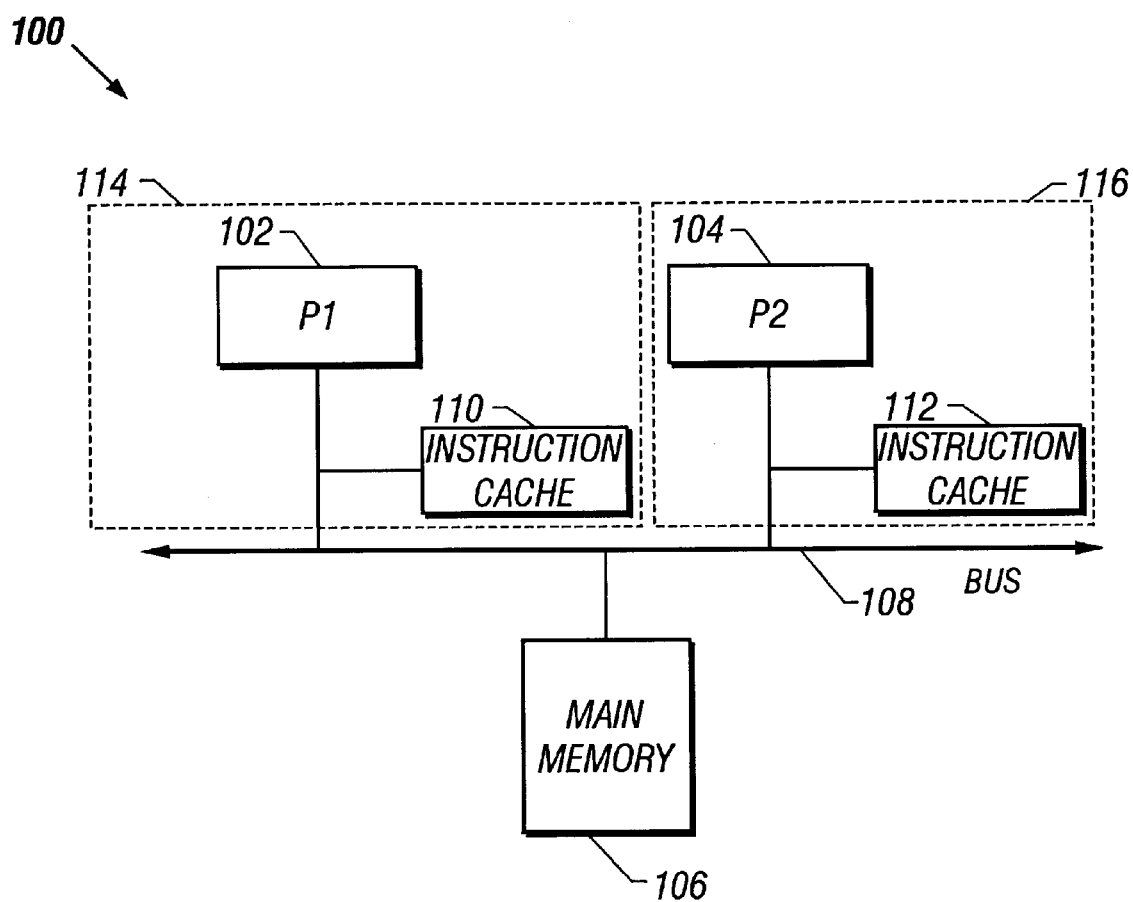
FIG. 1 is a block diagram of a prior art instruction cache subsystem of a multi-processors system.

Referring to prior art FIG. 1, instruction cache 110 and instruction cache 112 can simultaneously be storing the same instruction(s). Thus, the prior art system 100 uses valuable instruction cache storage by duplicating storage of the same instruction(s). In particular, the same instruction(s) may be stored in three different locations, main memory 106, instruction cache 110, and instruction cache 112.

Figure 2:
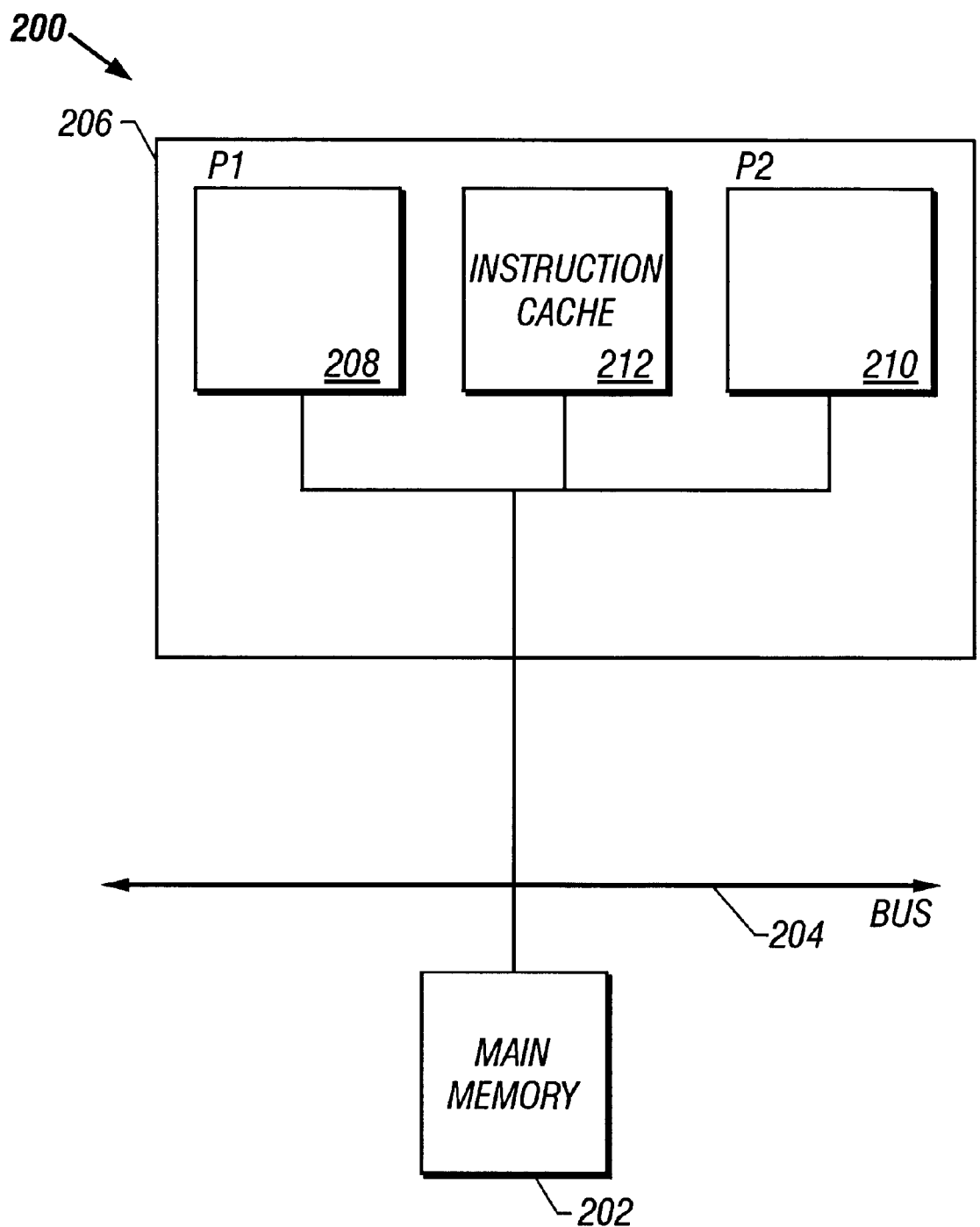
FIG. 2 is a block diagram of a shared instruction cache for multiple processors in accordance with one embodiment of the present invention.

Accordingly, FIG. 2 is a block diagram showing a multiple processor system having a shared instruction cache in accordance with one embodiment of the present invention. In particular, a system 200 includes a main memory 202, a bus 204 coupled to main memory 202, and an integrated circuit 206 coupled to bus 204. On integrated circuit 206 resides a P1 processor 208, a P2 processor 210, and a shared instruction cache 212. Thus, system 200 is a multiple processor system in which P1 processor 208 and P2 processor 210 are integrated on the same die (chip) and share the same instruction cache, instruction cache 212. In a preferred embodiment, instruction cache 212 is a 16-kilobyte cache (e.g., a conventional 16-kilobyte dual-ported cache that uses a well-known (standard) cache architecture of two-way set associative, 32-byte lines to minimize cost and timing risk). Shared instruction cache 212 may be included within the integrated circuit die or external to the integrated circuit die on which one or more of the processors reside.

By sharing instruction cache 212, system 200 efficiently uses instruction cache storage space by avoiding duplicating storage of instruction(s) in instruction cache 212 by P1 processor 208 and P2 processor 210. Shared instruction cache 212 advantageously eliminates cache coherency protocols, reduces total area of cache memory, and allows for the automatic sharing of code. For example, a particular instruction (e.g., opcode and register address specifier(s) or memory address specifier(s)) that is cached by both P1 processor 208 and P2 processor 210 uses one storage location of instruction cache 212 (e.g., a cache line in instruction cache 212). For example, if P1 processor 208 executes a particular library call, and subsequently P2 processor 210 issues the same library call, then if the library call executed by PI processor 208 is cached in instruction cache 212, P2 processor 210 can access the cached library call in instruction cache 212 rather than having to access main memory 202 via bus 204 thereby increasing performance. Accordingly, system 200 advantageously allows for the sharing of cached instructions in instruction cache 212 for P1 processor 208 and n processor 210. Additionally, because in many instances an operating system maps different library calls to different pages in memory, the use of a shared instruction cache which allows use of the same library call can save substantially half the cache space.

A challenge with sharing instructions among multiple processors is that the instruction may specify particular registers or particular memory address locations, while the multiple processors may use different registers or different memory address locations. For example, it may be advantageous for a particular thread of execution of a multi-threaded computer program to be executed on a first processor, and the same thread to be executed on a second processor, and then the register files of the threads of execution on the first processor and the second processor to subsequently be combined. However, if the thread of execution on the first processor and the thread of execution on the second processor specify the same registers, then these register files overlap and, thus, generally cannot be combined.

Figure 3:
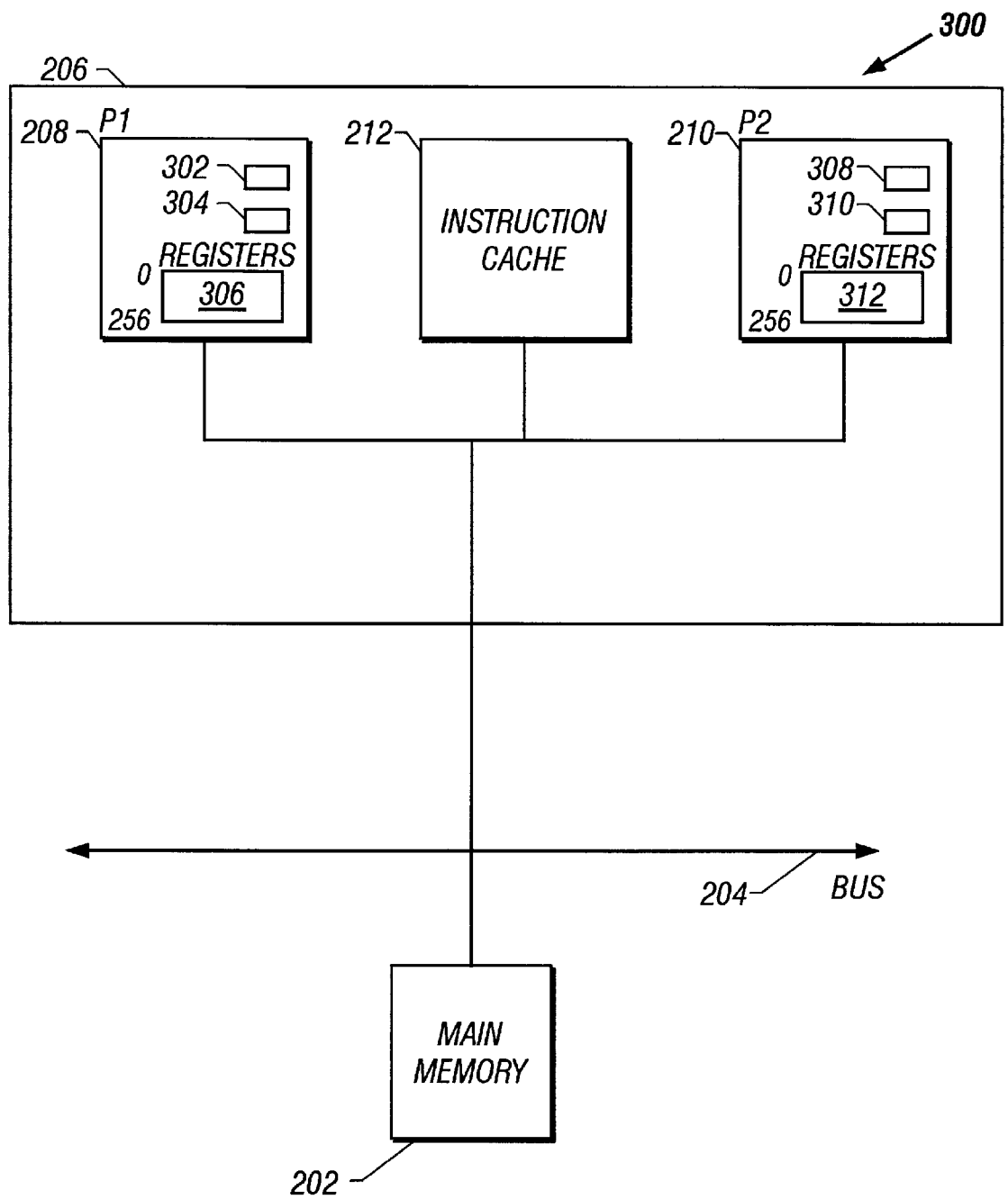
FIG. 3 is a block diagram of the shared instruction cache for the P1 processor and the P2 processor of FIG. 2 shown in greater detail in accordance with one embodiment of the present invention.

Accordingly, FIG. 3 is a block diagram of shared instruction cache 212 for P1 processor 208 and P2 processor 210 shown in greater detail in accordance with one embodiment of the present invention. A system 300 includes P1 processor 208, which includes a register index base 302, a memory address base 304, and registers (register file) 306, and P2 processor 210, which includes a register index base 308, a memory address base 310, and registers (register file) 312. Registers 306 include 256 registers, and registers 312 include 256 registers.

System 300 allows for the same instruction(s) to be stored in instruction cache 212 for P1 processor 208 and P2 processor 210, but also allows for the same instruction(s) stored in instruction cache 212 to access different registers or a different segment of the register files, registers 306 and registers 312, of P1 processor 208 and P2 processor 210 when executed on P1 processor 208 and P2 processor 210, respectively. System 300 also allows for the same instruction (s) stored in instruction cache 212 and executed on P1 processor 208 and P2 processor 210 to access different segments of main memory 202. In particular, system 300 includes register index base 302 and register index base 308 that are used to offset register address specifiers of instructions executed on P1 processor 208 and P2 processor 210, respectively. System 300 includes memory address base 304 and memory address base 310 that are used to offset memory address specifiers of instructions executed on P1 processor 208 and P2 processor 210, respectively. By setting (e.g., loading) the register index base registers and the memory address base registers of P1 processor 208 and P2 processor 210 to different values, system 300 allows for a hardware implemented segmentation of the register files and the main memory of system 300.

For example, register index base 302 of P1 processor 208 can be set to 0, which results in a one-to-one correlation between the registers specified in an instruction and the registers used by P1 processor 208 during execution of the instruction. However, register index base 308 of P2 processor 210 can be set to 128. As a result, register address specifiers of the instruction executed on P2 processor 210 are offset using the value of register index base 308 and, in particular, are offset by either adding 128 to the register address specifier value or concatenating 128 to the register address specifier value of the instruction. For example, offsetting register address specifiers of instructions executed on P2 processor 210 by 128 can be implemented by setting the upper bit of an 8-bit address for the register address specifier to 1. If software compilers for system 300 and software written for system 300 only include functions that specify up to 128 registers, then register address specifiers would not need to specify a register address with the upper bit of an 8-bit address set to 1, because it only needs to specify (address) registers in the range of 0 to 127. Thus, adding 128 to a register address specifier in this case is nearly free from a performance standpoint, because the register index base stored in register index base 308 can simply be concatenated with the register address specifier. Accordingly, system 300 effectively segments the register files of P1 processor 208 and P2processor 210 into two segments by setting register index base 302 to 0 (i.e., registers 0 to 127) and register index base 308 to 128 (i.e., registers 128 to 255).

As another example, some microprocessors include processors that only use 32 registers (e.g., Sun Microsystems' well-known SPARC architecture uses 32 registers). Thus, register index base 302 and register index base 308 can be set to specify eight different segments by using the upper three bits of an 8-bit address for a register address specifier to define the eight different segments. For example, the upper three bits can be set to 000, for a segment including registers 0 to 31, 001 for a segment including registers 32 to 63, 010 for a segment including registers 64 to 95, and 111 for a segment including registers 223 to 255. Thus, eight segments of registers or octants can be defined in this example.

System 300 also allows for P1 processor 208 and P2 processor 210 executing the same instruction(s) cached in instruction cache 212 to access different locations or segments in main memory 202. In particular, system 300 provides an efficient hardware implemented approach, unlike a software implemented approach, which requires significant additional set-up code. For example, memory address base 304 of P1 processor 208 can be set to 0. Thus, memory address specifiers of an instruction executed on P1 processor 208 results in a one-to-one correlation between the memory locations accessed in main memory 202 and the memory address specifiers of the executed instruction. However, memory address base 310 of P2 processor 210 can be set to 10,000 (base 10, that is, a decimal value). Thus, memory address specifiers of the instruction executed on P2 processor 210 are offset by the value 10,000. Hence, main memory 202 is segmented between P1 processor 208 and P2 processor 210 (assuming no memory address specifiers exceed 9,999). The offset operation for memory address specifiers can be implemented as an add or a concatenation operation as similarly described above with respect to the offset operation for register address specifiers.

In one embodiment, memory address base 304 and memory address base 310 each include a load address base for load operations and a store address base for store operations. For example, it may be desirable for P1 processor 208 and P2 processor 210 to share input data, which is stored in main memory 202 or a data cache (not shown). Thus, load address bases of P1 processor 208 and P2 processor 210 can be set to the same value. For example, P1 processor 208 and P2 processor 210 can process the same image stored as data in data memory (e.g., main memory 202 or a data cache). However, P1 processor 208 and P2 processor 210 can process the stored data image differently. For example, P1 processor 208 can change the colors of the data image from green to red, while P2 processor 210 changes the colors of the data image from green to blue. It may be desirable to then compare the differently processed images. Thus, the store address bases of P1 processor 208 and P2 processor 210 can be set to different values such that the differently processed data images are stored in different storage locations in data memory.

For example, instructions for library calls can be shared in instruction cache 212 and executed on P1 processor 208 and P2 processor 210 using different segments of the register files of P1 processor 208 and P2 processor 210, respectively. Thus, only one library call routine can be written, and system 300 advantageously allows for the segmentation of the register files, such as registers 0 to 127 for P1 processor 208 and registers 128 to 255 for P2 processor 210. Otherwise, a second library routine call would need to be written to achieve the same functionality, a first library routine call specifying registers 0 to 127, and a second library routine call specifying registers 128 to 255. Alternatively, the code can be written with support for sharing, which includes indirect addressing, jump tables, and other methods, which increase the footprint of the routine which slows down execution. Also, such an implementation would require twice the space in main memory 202 for storing the second library routine call and would effectively reduce the instruction cache 212 hit rate and use instruction cache 212 less efficiently. Moreover, because the first and second library routine call in such an implementation would reside in two different storage locations in main memory 202, there is a possibility that the stored memory routine calls can be stored at locations that are a multiple of 16 kilobytes apart. If instruction cache 212 is a 16-kilobyte instruction cache, then these library routine calls generally could not both simultaneously reside in instruction cache 212 and, thus, would require main memory access, which is expensive from a performance standpoint.

System 300 is flexible. If segmentation of the register files or main memory is not desired, then the register address bases and the memory address bases of P1 processor 208 and P2 processor 210 can simply be set to the same values (e.g., 0).

For example, a computer program can include multiple threads of execution (i.e., a multi-threaded computer program). In a multi-threaded computer program, a compiler that compiles the multi-threaded computer program can generate "set base register" instructions for setting the register index bases (e.g., loading a value into the register index bases) and instructions for setting the memory address bases. The setting of the registers index base registers and the memory address base registers can be performed at the beginning of each thread of the compiled multi-threaded computer program. Thus, as the threads are allocated to different processors (CPUs), the base register values are set accordingly. Thus, as part of a thread safe compilation process, the threads of the multi-threaded computer program can be allocated different segments of the register file or different segments of the main memory or both. For example, thread 1 of a multi-threaded computer program can operate on registers 0 to 31, thread 2 can operate on registers 32 to 63, . . . , and thread 8 can operate on registers 228 to 255. Similarly, different threads can be allocated different segments of main memory so that they do not overwrite the same main memory storage locations. Moreover, unlike a software implemented approach, system 300 allows for this implementation without requiring significant additional set-up code. In this example, an operating system can send thread 1 to P1 processor 208, send thread 2 to P2 processor 210, and send thread 3 to the next available processor. But by compiling thread 3 such that it has a different register index base and a different memory address base, thread 3, regardless of which processor it ends up executing on, can be using a different segment of the register file of the processor and a different segment of main memory 202.

The instructions stored in instruction cache 212, which is shared between P1 processor 208 and P2 processor 210, are not modified, and in particular, the register address specifiers and the memory address specifiers of the instructions remain the same values. For example, pseudo code of a compiled multi-threaded computer program is listed below.

```
BEGIN THREAD 1
    /*Initialize the base registers*/
    Set register index base
    Set store address base
    Set load address base
CALL
    F(x)
    F(x,y)
    F(w)
END THREAD 1 /*do not need to reset the base
registers, because the next thread will initialize
the base registers*/
```

As shown in the above pseudo code, at the beginning of a compiled thread 1, the base registers are set or initialized.

Thus, a register index base is set to a particular value, a store address base is set to a particular value, and a load address base is set to a particular value. Thread 1 then executes various instructions such as calls to various functions (e.g., library calls). At the end of thread 1, the base registers do not need to be reset, because the next thread will appropriately initialize the base registers.

Figure 4:
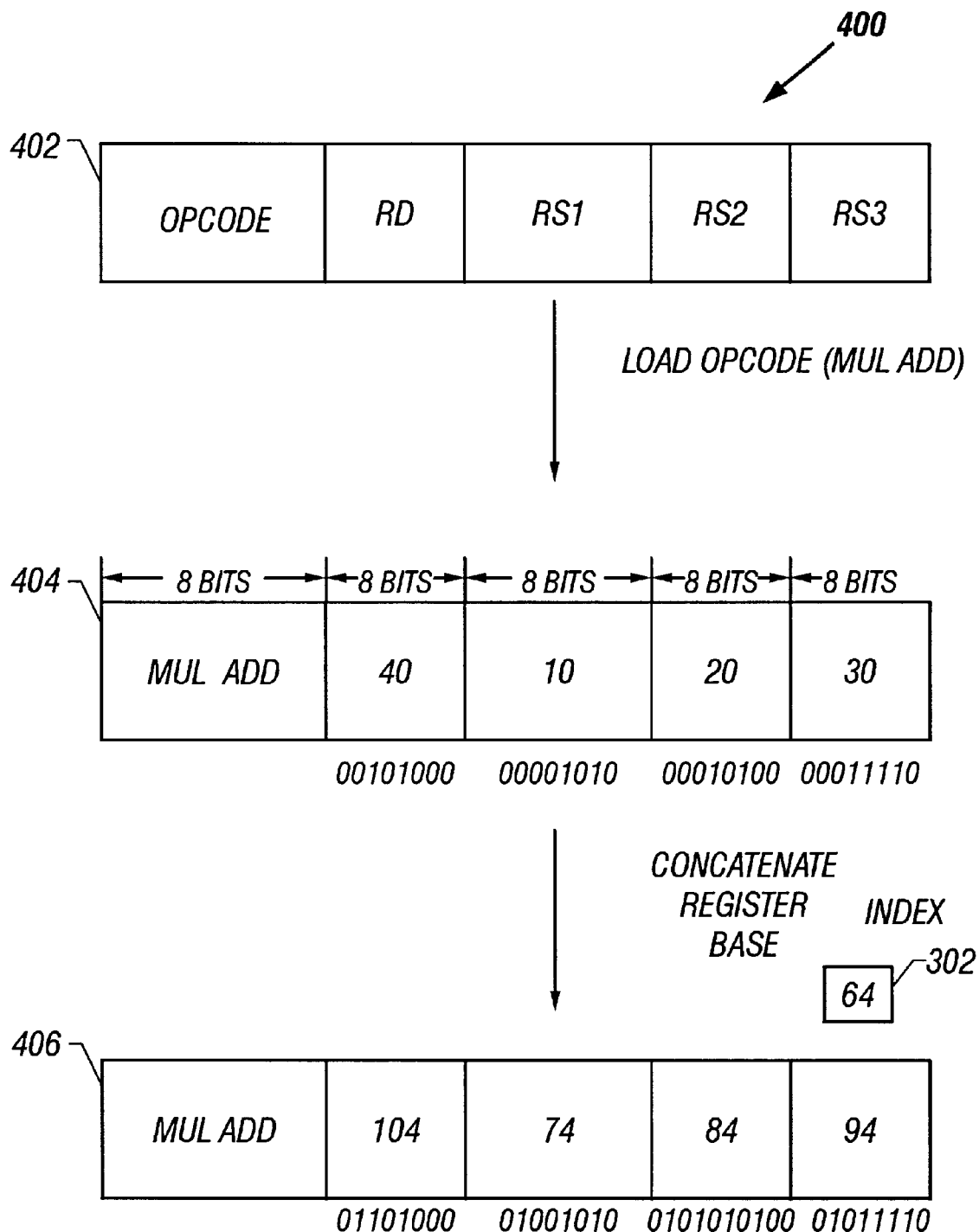
FIG. 4 is a functional diagram of an offset operation using a register index base in accordance with one embodiment of the present invention.

FIG. 4 is a functional diagram 400 of an offset operation using a register index base in accordance with one embodiment of the present invention. Block 402 is a storage location for an operation code (opcode) that includes a register destination (Rd) and up to three register address specifiers (RS1, RS2, and RS3). Block 404 is a storage location that is loaded with a multiply add opcode, MUL ADD. Block 404 includes the MUL ADD operation, which requires 8 bits, an 8-bit Rd that is set to the decimal value of 40, an 8-bit RS1 that is set to the decimal value of 10, an 8-bit RS2 that is set to the decimal value of 20, and an 8-bit RS3 that is set to the decimal value of 30. The MUL ADD operation multiplies RS1 and RS2, then adds RS3 to the product, and stores the result in RS4. The binary equivalents to the decimal values stored in the register address specifiers of block 404 are shown below each sub-block. The register index base stored in register index base register 302 of P1 processor 208 is concatenated to the register address specifiers of block 404. The result of the concatenation of the register index base with the register address specifiers of block 404, assuming the register index base is set to the decimal value of 64, is shown in block 406. In particular, block 406 is a storage location that includes the MUL ADD opcode, RS1 now set to 104, RS2 now set to 74, RS3 now set to 84, and RS4 now set to 94. The binary equivalents of the decimal values of the register address specifiers of block 406 are shown below each subblock.

Figure 5:
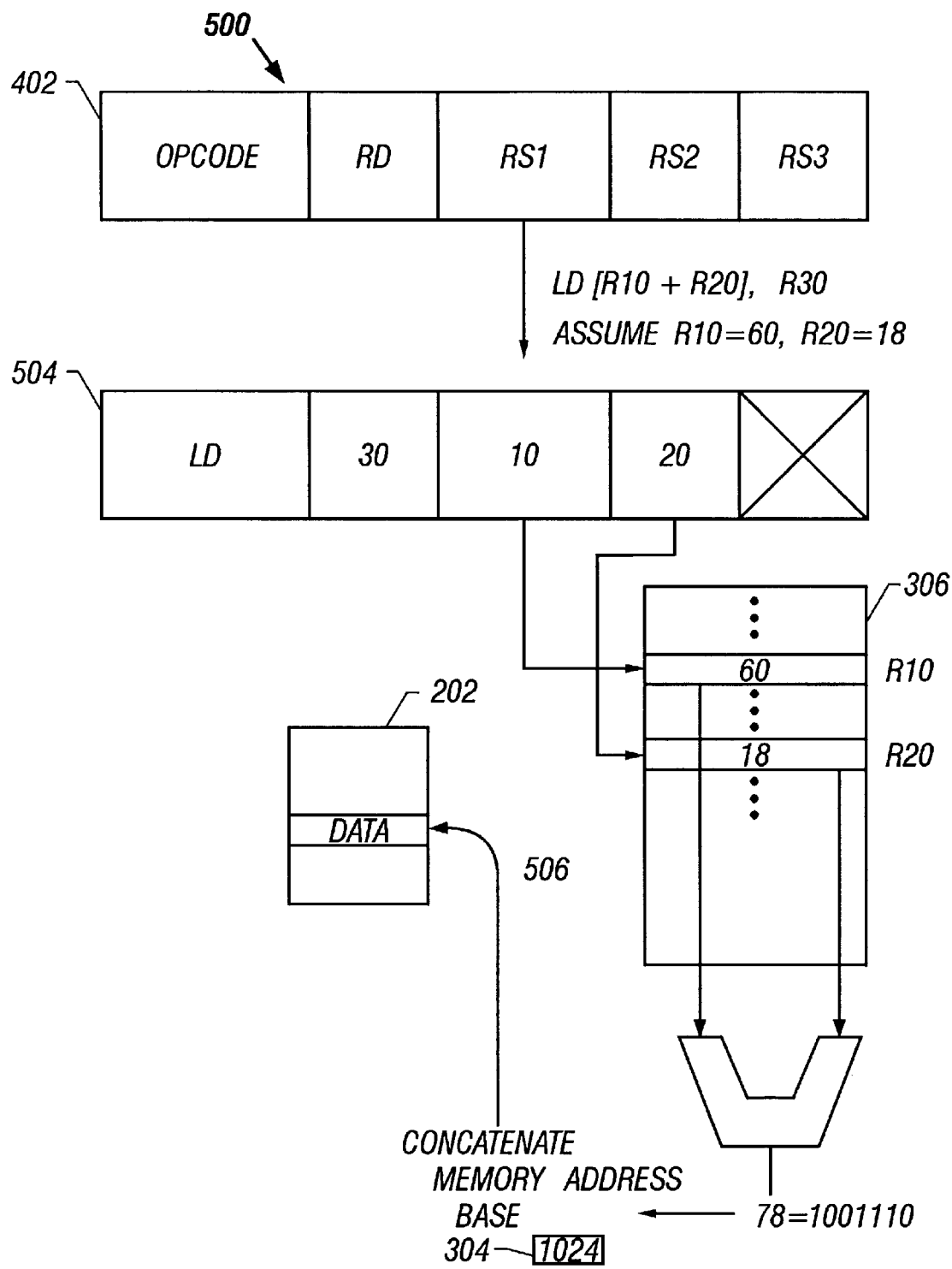
FIG. 5 is a functional diagram of an offset operation using a memory address base in accordance with one embodiment of the present invention.

FIG. 5 is a functional diagram 500 of an offset operation using a memory address base in accordance with one embodiment of the present invention. Functional diagram 500 includes block 402 that is a storage location for an opcode that includes up to four register address specifiers. Block 504 is a storage location that is loaded with the "ld [R10+R20], R30" operation. As shown in FIG. 5, R10 and R20 are storage locations in register file 306. The storage location R10 stores the decimal value 60, and the storage location R20 stores the decimal value 18. The load operation results in the addition of the decimal value 60 and the decimal value 18, which equals the decimal value 78 (i.e., a binary value 1001110). The memory address base, which is stored in memory address base register 304, is then concatenated with the binary value equal to 78 to provide a new memory address pointer 506 that points to a storage location of main memory 202. If the memory address base is set to 1024 in decimal (base 10) or 1000000000 in binary, then pointer 506 points to memory address location 1102 in decimal or 1001001110 in binary in main memory 202. This concatenation operation can be implemented without requiring significant extra gates in the critical path. If a first thread, which sets register address bases and memory address bases to different values, desires to know the results of the execution of a second thread, then the first thread can set the register address bases and the memory address bases to the same values as the second thread.

Although particular embodiments of the present invention have been shown and described, it will be obvious to those skilled in the art that changes and modifications can be made without departing from the present invention in its broader aspects, and therefore, the appended claims are to encompass within their scope all such changes and modifications that fall within the true scope of the present invention.

What is claimed is:

1. An apparatus for a microprocessor, comprising:
    a shared instruction cache, the shared instruction cache being shared by a first processor and a second processor of the microprocessor; and
    a first register index base coupled to the first processor, and
    a second register index base coupled to the second processor,
    wherein the first register index base and the second register index base enable a single instruction stored in the shared instruction cache to be executed on both the first processor and the second processor.

2. The apparatus of claim 1 further comprising:
    a first memory address base for the first processor and a second memory address base for the second processor.

3. The apparatus of claim 2 further comprising:
    a first set of registers for the first processor and a second set of registers for the second processor.

4. The apparatus of claim 3 wherein the first set of registers comprises 256 registers, and the second set of registers comprises 256 registers.

5. The apparatus of claim 3 further comprising:
    a bus connected to the first processor and the second processor; and
    a main memory connected to the bus.

6. The apparatus of claim 3 wherein the instruction cache stores an instruction, the instruction being executed by the first processor, and the instruction being executed by the second processor.

7. The apparatus of claim 3 wherein the instruction cache stores an instruction that comprises a register address specifier, the register address specifier being offset using the first register index base when the instruction is executed by the first processor, and the register address specifier being offset using the second register index base when the instruction is executed by the second processor.

8. The apparatus of claim 3 wherein the instruction cache stores an instruction that includes the memory address specifier, the memory address specifier being offset using the first memory address base when the instruction is executed by the first processor, and the memory address specifier being offset using the second memory address base when the instruction is executed by the second processor.

9. The apparatus of claim 3 wherein the first register index base is a first value stored in a first register, the second register index base is a second value stored in a second register, the first memory address base is a third value stored in a third register, and the second memory address base is a fourth value stored in a fourth register.

10. The apparatus of claim 3 wherein the instruction cache is shared by the first processor, the second processor, and at least one other processor.

11. The apparatus of claim 3 wherein the first memory address base comprises a first load address base and a first store address base, and the second memory address base comprises a second load address base and a second store address base.

12. A method for a shared instruction cache of a microprocessor, comprising:
    storing an instruction in an instruction cache, the instruction cache being shared by a first processor and a second processor of the microprocessor;
    storing a first register index base for the first processor;
    storing a second register index base for the second processor; and, using the first register index base and the second register index base to enable the instruction to be executed on both the first processor and the second processor.

13. The method of claim 12 further comprising:

storing a first memory address base for the first processor and a second memory address base for the second processor.

14. The method of claim 13 further comprising:

executing the instruction stored in the instruction cache on the first processor by offsetting a register address specifier of the instruction using the first register index base; and executing the instruction stored in the instruction cache on the second processor by offsetting the register address specifier using the second register index base.

15. The method of claim 14 further comprising:

segmenting a first register file of the first processor and a second register file of the second processor using the first register index base and the second register index base, respectively, so that the first register file and the second register file can be combined after executing a thread of a multi-threaded computer program on the first processor and the second processor.

16. The method of claim 13 further comprising:

executing the instruction stored in the instruction cache on the first processor by offsetting a memory address specifier using the first memory address base; and executing the instruction stored in the instruction cache on the second processor by offsetting the memory address specifier using the second memory address base.

17. The method of claim 16 further comprising:

segmenting a main memory using the first memory address base and the second memory address base so that a thread of a multi-threaded computer program executed by the first processor uses a first segment of the main memory, and the thread of the multi-threaded computer program executed by the second processor uses a second segment of the main memory, wherein the first segment and second segment do not overlap.

18. The method of claim 16 further comprising:

storing a first load address base for the first processor and storing a second load address base for the second processor; and storing a first store address base for the first processor and storing a second store address base for the second processor.

19. The method of claim 16 wherein the offsetting is performed using a concatenation operation.

20. An apparatus for a shared instruction cache, comprising:

an instruction cache, the instruction cache storing an instruction that can be executed by a first processor and by a second processor;

a first register index base for the first processor stored in a first register; and a second register index base for the second processor stored in a second register.

21. The apparatus of claim 20 further comprising:

a first memory address base for the first processor stored in a third register; and a second memory address base for the second processor stored in a fourth register.

22. The apparatus of claim 21 wherein the first memory address base and the second memory address base each comprise a load address base and a store address base.

* * * * *